US005966792A

United States Patent [19]

James

[11] Patent Number: 5,966,792

[45] Date of Patent: Oct. 19, 1999

[54] TOOL FOR DISASSEMBLING AND ASSEMBLING UNIVERSAL JOINTS

[76] Inventor: William G. James, 855 Route 113, Harleysville, Pa. 19438

[21] Appl. No.: 08/792,648

[22] Filed: Jan. 31, 1997

[51] Int. Cl.$^{6}$ ...................................................... B23P 19/04

[52] U.S. Cl. .............................. 29/244; 29/259; 29/426.5

[58] Field of Search .............................. 29/426.5, 898.07, 29/898.08, 898.01, 525, 257, 258, 259, 260, 261, 263, 264, 244; 269/130, 131, 132

[56] References Cited

U.S. PATENT DOCUMENTS

| | | | |
|---|---|---|---|
| 3,008,226 | 11/1961 | Kellerman | 29/898.08 |
| 4,463,489 | 8/1984 | James | 29/529 |
| 5,177,852 | 1/1993 | James | 29/529 |
| 5,220,716 | 6/1993 | Lostra | 29/252 |

*Primary Examiner*—S. Thomas Hughes
*Assistant Examiner*—Jermie E. Cozart
*Attorney, Agent, or Firm*—Diller, Ramik & Wright, PC

[57] ABSTRACT

A universal joint tool is provided for assembling and disassembling a universal joint including its cross and bearing cups relative to a drive shaft and/or transmission shaft yokes. The tool includes first and second relatively moveable members which are moved between two positions by a threaded screw which additionally creates a force transferred by flexible cables to the cross or to a force-applying bar which includes locating surfaces for accurately inserting a bearing assembly relative to a yoke arm opening. An annular sleeve receives a gauge insert for similarly accurately locating a bearing assembly relative to an associated yoke arm opening.

20 Claims, 6 Drawing Sheets

TOOL FOR DISASSEMBLING AND ASSEMBLING UNIVERSAL JOINTS

BACKGROUND OF THE INVENTION

The invention is directed to a tool for disassembling a universal joint, including its cross and bearing assembly, from a drive shaft yoke, a transmission shaft yoke or the like.

BACKGROUND OF THE INVENTION

U.S. Pat. Nos. 4,463,489 and 5,177,852 granted respectively on Aug. 7, 1984 and Jan. 12, 1993 in the name of William G. James are each directed to a universal joint tool for disassembling a universal joint. The universal joint tool includes first and second relatively movable plate members which are moved by a threaded screw which carries a first of the plate members. The first of the plate members also has connected thereto opposite ends of flexible cables which are embraced about opposite arms of a universal joint cross. As the screw is turned to move the plates away from each other, the cross is drawn toward the puller carrying with it the bearing assembly resulting in the removal thereof from the associated yoke arm opening. The universal joint tool of U.S. Pat. No. 4,463,489 also includes a pair of rods which are threaded into threaded bores of an associated yoke arm for accurately locating the tool relative to the particular yoke arm from which a bearing assembly is being pulled or disassembled.

Both of the aforementioned patents are designed to both disassemble and assemble the bearing assemblies or bearing cups relative to so-called “full-round” yokes which are normally of a one-piece cast/forged and machined construction. Such “full-round” yokes are extremely strong and are capable of handling heavy torque loads and gruelling off-road terrain. However, disassembling a universal joint which includes two “full-round” yokes is difficult, and recent innovation has lead to heavy duty drive shafts which include universal joints defined by one “full-round” yoke and one “half-round” yoke and its associated cold-formed bearing retainers bolted in place. In these universal joints, disassembly of one-half of the universal joint is relatively easy and straight-forward, namely, four bolts, the associated bearing retainers and the associated bearing assemblies are removed.

More recently Spicer Drive Shaft Division of Dana Corporation introduced its “Spicer Life Series Drive Shafts” designed to be compatible with today’s advancing power trained specifications for higher engine torque and lower axle ratios. The entire drive shaft system has been re-engineered, including the universal joints and bearing retainers.

In the Spicer Life universal joint, one of the yokes is a half-round yoke which utilizes a cold-form bearing retainer and is bolted to the half-round yoke. This half of the universal joint can be readily assembled and disassembled. The other half of the universal joint is a full-round yoke in which bearing assemblies are press fit in openings of the yoke arms to a precise location and are held in place by a “chordal” bearing retainer which partially circumferentially overlaps an end face of the bearing assembly housing and is held in position by a pair of bolts threaded in the threaded bores of each yoke arm. The present invention is directed to a tool for disassembling such bearing assemblies relative to the full-round yokes and reassembling bearing assemblies relative thereto.

SUMMARY OF THE INVENTION

The universal joint tool of the invention includes first and second members which are relatively movable between first and second positions by a screw, and associated therewith are a pair of flexible cables, just as are disclosed in the latter-identified James’ patents. Additionally, the second movable member carries an annular member which in turn carries a pair of locating pins which are received in the threaded openings of the arms of the full-round yoke for locating the tool relative thereto. When the flexible cables entrained about arms of the universal cross are tensioned by the screw, the cross is pulled in a direction forcing the bearing assembly out of the bearing opening and into a recess of the annular member. The tension on the cables is relaxed, the bearing assembly/bearing cup is removed from within the annular member, and the tool is identically operated on the opposite arm of the full-round yoke to pull the other bearing assembly therefrom. Thus, as compared to the earlier patented James’ invention, the tool is not threadably connected to diametrically opposite threaded openings of a yoke journal, but instead smooth-surfaced locating or guide pins are received in the bearing retainer threaded openings of each yoke arm which are located on the same side of a diametrical plane through the yoke arm openings. Furthermore, an end face of the annular member bears over its 360° against the yoke arm immediately adjacent the bearing assembly to assure that the tensioning forces applied by the flexible cables are uniformly and evenly applied to the cross so that it moves axially, does not cock, and the bearing assembly will be progressively removed from the yoke arm absent damage thereto.

During assembly, the same annular member and locating pins are utilized for locating purposes. The flexible cables each have an additional enlarged head adjacent one end for initial connection to the first movable member. This allows for a longer (total) length of each flexible cable to be utilized because, during assembly, the flexible cables do not engage opposite arms of the cross but instead are received in spaced grooves of a generally cylindrical force-applying bar having a substantially cylindrical recess which partially houses a bearing assembly which is to be press fit into a bearing assembly opening of an associated yoke arm. The force-applying bar includes a uni-planar/flat locating surface which bottoms against an outer surface of the yoke arm to limit the insertion of the bearing assembly relative to the yoke arm opening. The cylindrical recess also includes a uni-planar/flat locating surface against which an end wall of the bearing cup rests and against which forces are applied as the flexible cables are tensioned. The distance between the two locating surfaces defines the axial length of the bearing assembly projecting away from the yoke arm and serves to precisely locate the bearing assembly within each yoke arm opening.

The annular member also receives a gauge insert in the form of a cylindrical member having a locating surface against which bottoms the end face of the opposite bearing assembly, if the latter assembly is to then be inserted into the remaining yoke arm, or if the tool is reversed, the distance between the locating surface of the gauge insert and the annular end face of the annular member corresponds to the distance between the locating surfaces of a force-applying bar. Because of this relationship, the second bearing assembly can be assembled in one of two different ways. After the force-applying bar has inserted the first bearing assembly and the flexible cables have been relaxed and loosened, the second bearing assembly can be positioned partially within the annular member. The cables are then tensioned and the latter bearing assembly will be drawn into its associated yoke arm opening and upon the associated arm of the cross. The previously applied bearing assembly is held in its assembled position and accurately located thereat by the force-applying bar which remains positioned. Once the tool is totally loaded by the tension cables, both bearing assemblies are accurately located with respect to each yoke arm and its associated cross arm. The second procedure for inserting/assembling the second bearing assembly is to simply reverse the tool and position the annular member relative to the first-assembled bearing assembly and utilize the force-applying bar in association with the second bearing assembly in the manner first described. In this case the exact location of the first assembled bearing assembly is maintained by the gauge insert within the annular member and, of course, the uni-planar/flat locating surfaces of the force-applying bar accurately locate the second inserted bearing assembly. Thus, the universal joint tool provides fast, safe and efficient disassembly and assembly of bearing assemblies with respect to full-round yokes of the type utilizing tangential or chordal bearing retainers whose openings, bolts and the associated threaded openings of the yoke arm are located on the same side of a diametrical plane through the yoke arm opening.

With the above and other objects in view that will hereinafter appear, the nature of the invention will be more clearly understood by reference to the following detailed description, the appended claims and the several views illustrated in the accompanying drawings.

DESCRIPTION OF THE PREFERRED EMBODIMENTS

Figure 1:
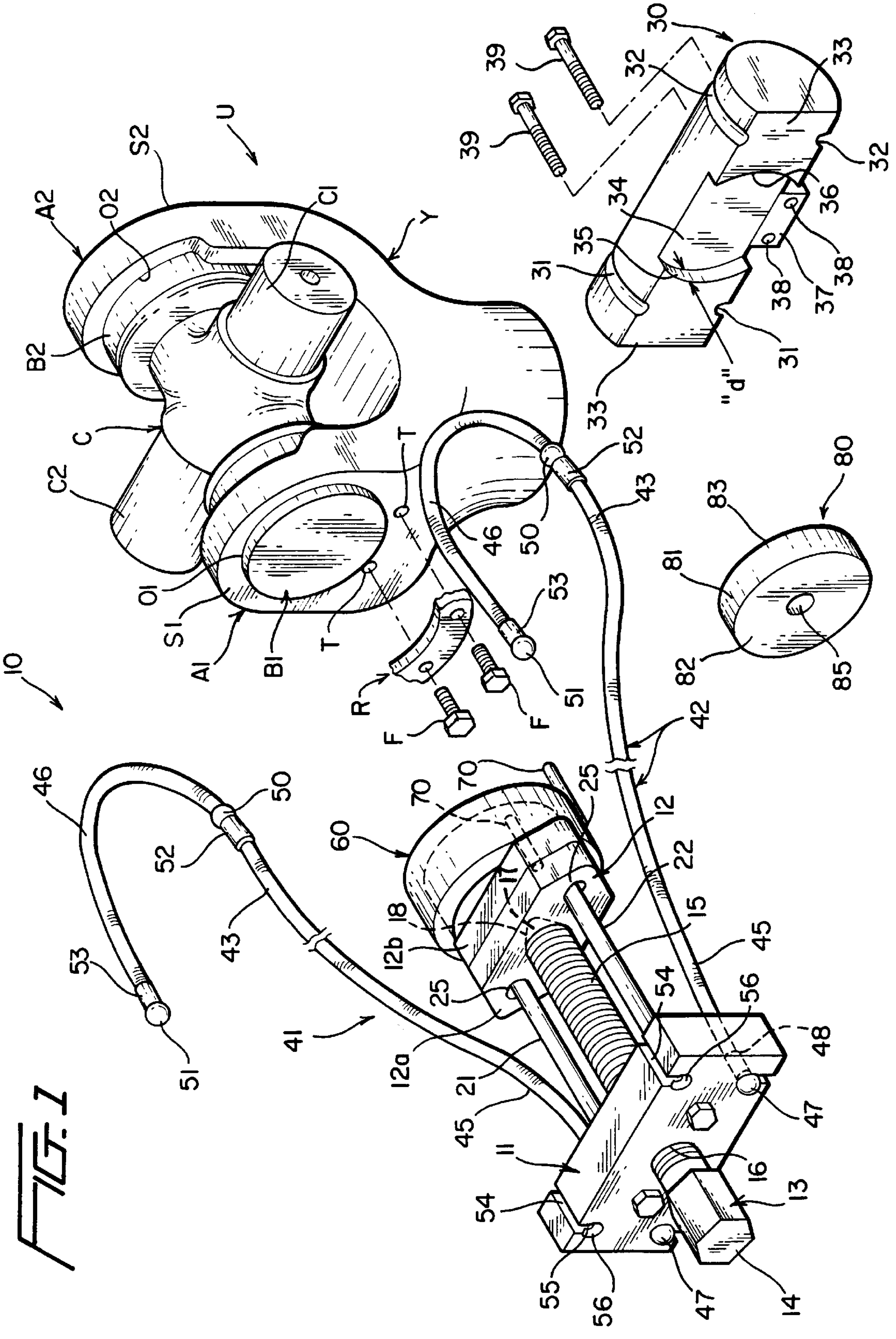
FIG. 1 is a perspective view of a novel universal joint tool of the present invention, and illustrates first and second relatively movable members, a screw associated therewith, a pair of flexible cables, an annular member carrying locating pins fixed to the second member, a cylindrical gauge insert selectively associated with the annular member, and a generally cylindrical force-applying bar having a recess and a pair of locating surfaces which can be mounted for sliding movement by a pair of bolts relative to openings in arms of a full-round yoke to assemble/disassemble bearing assemblies relative to arms of an associated cross.

A novel universal joint tool constructed in accordance with this invention for disassembling and assembling a universal joint is generally designated by the reference numeral 10.

The universal joint tool 10 is specifically designed to be used to assemble and disassemble bearing assemblies from a universal joint U (FIG. 1) associated with a drive shaft and/or a transmission shaft (not shown). More specifically, the universal joint tool 10 is designed to disassemble (pull) and reassemble bearing assemblies or bearings B1, B2 relative to respective axially aligned bearing assembly openings or yoke arm openings O1, O2 in respective yoke arms A1, A2 of a full-round forged yoke Y which is one of two yokes (other yoke unillustrated) defining the universal joint U. The unillustrated yoke is a half-round yoke of the type earlier described in which each associated bearing assembly (not shown) is secured by an associated cold-formed bearing retainer (also not shown) and bolts threaded into threaded bores in the end faces (not shown) of the half-round yoke. This assembly and reassembly of the bearings associated with such half-round yokes is of no consequence with respect to the present invention. The arms A1, A2 of the yoke Y include respective exterior relatively flat uni-planar surfaces S1, S2. Identical threaded pairs of bores T, T open through each of the surfaces S1, S2 of each of the yoke arms A1, A2, respectively, and normally receive identical fasteners F in the form of threaded bolts which secure a chordal bearing retainer R and each bearing assembly B1, B2 in its assembled position. The bearing retainers R are removed to access the bearing assemblies B1, B2 during disassembly and reassembly, as will be described more fully hereinafter.

Figures 4, 5:
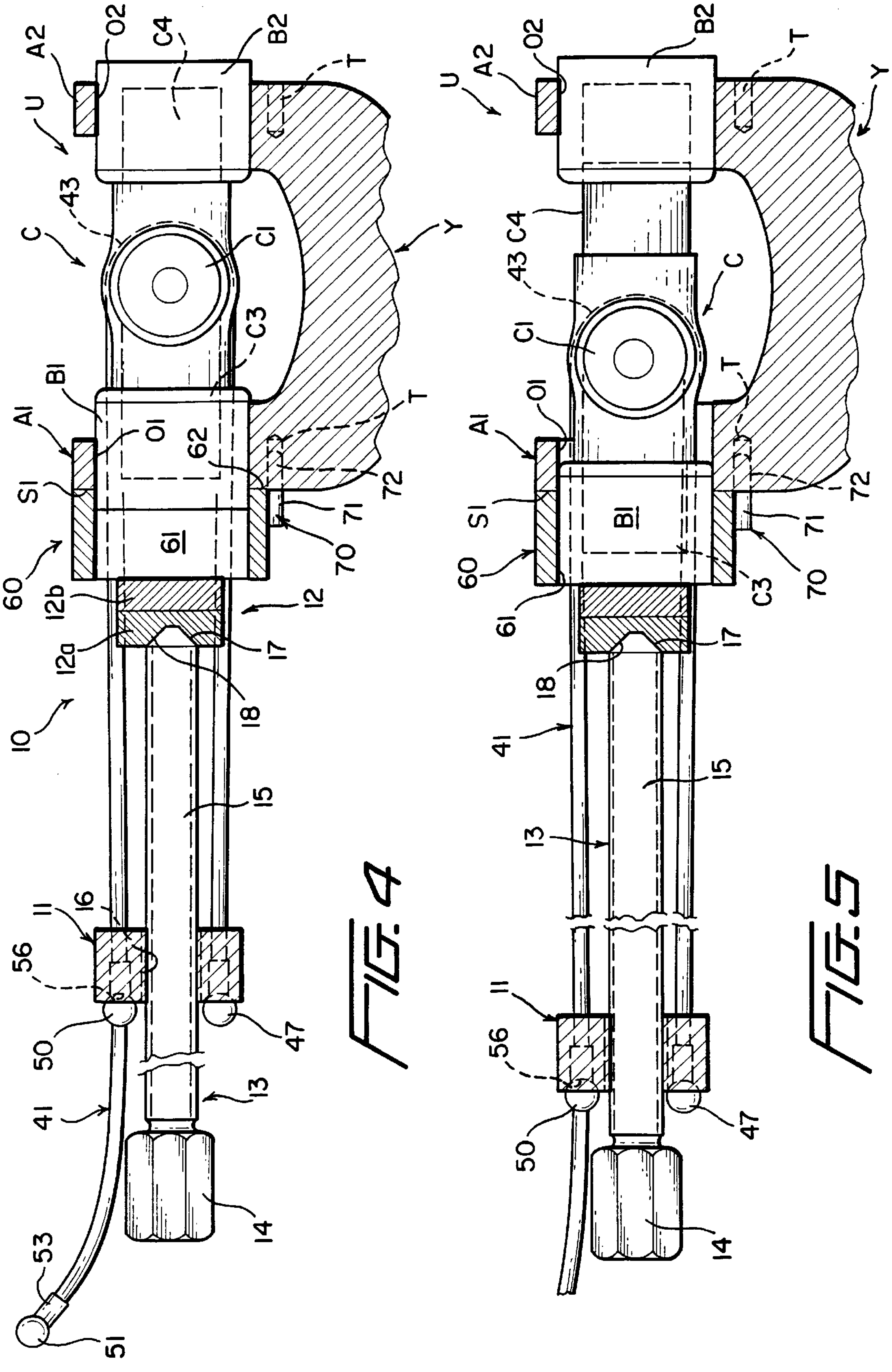
FIG. 4 is a fragmentary cross sectional view taken generally axially through the tool as assembled to the universal joint to disassemble a bearing assembly, and illustrates the annular member bearing against an exterior surface of a yoke arm with the locating pins slid in threaded bearing retainer bores of the yoke arm.
FIG. 5 is a cross-sectional view substantially identical to that of FIG. 4, and illustrates the manner in which the cross has been pulled to the left from the position shown in FIG. 4 by the threading of the screw pulling the relatively movable members apart by the pair of cables thereby pushing the bearing assembly out of the yoke arm opening/bearing assembly opening and into the interior of the annular member with the opposite illustrated bearing assembly being removed in the same manner.

The universal joint U further includes a cross C having aligned oppositely directed pairs of cross arms C1, C2 and C3, C4 (FIGS. 4 and 5). Bearing assemblies B1, B2 journal the respective cross arms C3, C4, as is illustrated in FIG. 4 and is apparent from FIG. 1.

The universal joint tool 10 includes first and second relative movable members or plates 11, 12 with the latter plate 12 being illustrated as a pair of plates 12*a*, 12*b*, though a single plate would suffice. The plate 12*a* actually corresponds to the plate 12 of U.S. Pat. No. 4,463,489 and by welding the plate 12*b* thereto, common elements of the universal joint puller of the latter-identified patent can be used to manufacture universal joint tool 10 of the present invention.

Figure 8:
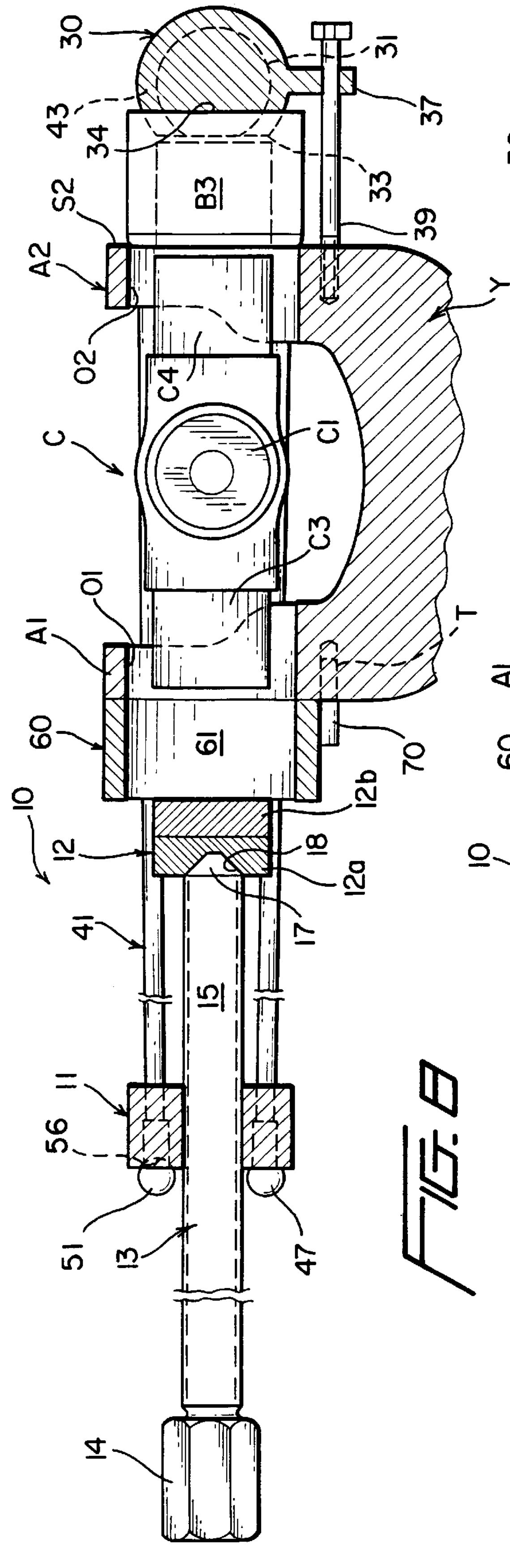
FIG. 8 is a longitudinal cross-sectional view similar to FIGS. 4 and 5 of the drawings, and illustrates the manner in which the bearing assembly is to be inserted in the opening of the associated yoke arm as the force-applying bar is moved right-to-left by the flexible cables.
Figure 9:
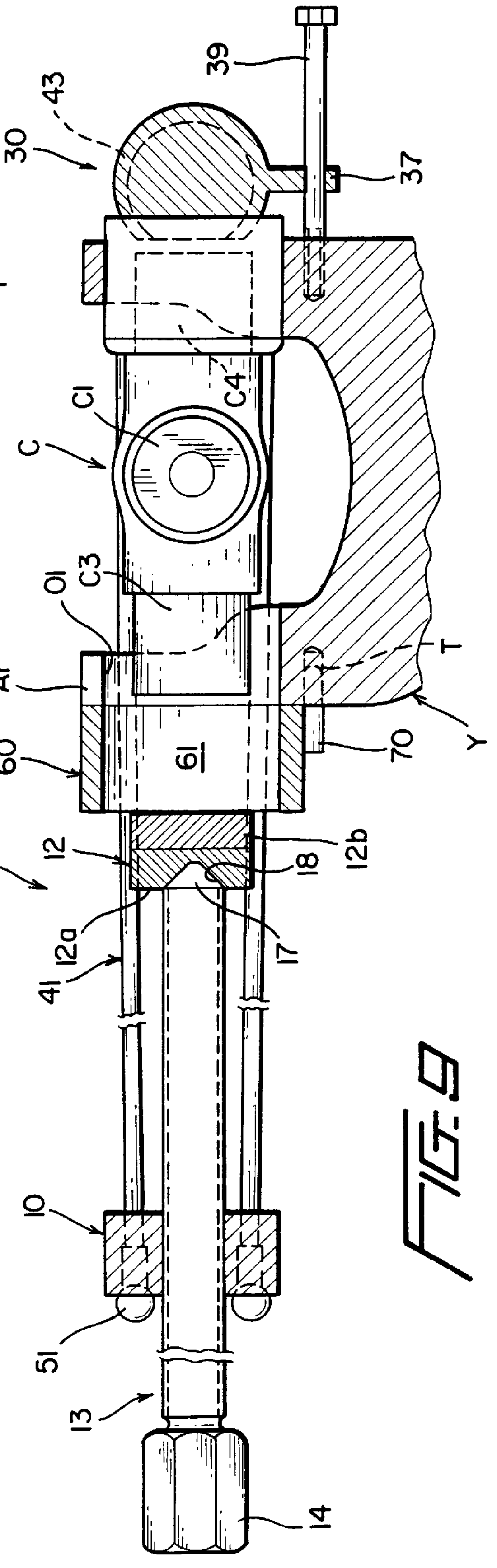
FIG. 9 is a cross-sectional view substantially identical to that of FIG. 8, and illustrates the bearing assembly in its fully seated position accurately located therein by virtue of a dimension established between uni-planar parallel locating surfaces of the force-applying bar.

The members or plates 11, 12 are adapted to be moved between a first position adjacent each other (FIGS. 4 and 8) and a second more remote or spaced position (FIGS. 5 and 9). Means in the form a screw 13 having a hex head 14 and a threaded shank 15 is threaded through a threaded bore 16 of the member 11 for applying force between the first and second members 11, 12, respectively, to move the same between the first and second positions heretofore noted incident to disassembling a bearing (B1 of FIGS. 4 and 5, for example) or reassembling a bearing assembly B3 of FIGS. 8 and 9 relative to the yoke Y. A lower end portion (unnumbered) of the screw 13 terminates in a conical head 17 which seats in an outwardly opening conical recess 18 of the second member 12 whereby upon appropriate direction of rotation of the screw 13, the member 11 will move away from the member 12 and this force will be transmitted to the cross C during bearing assembly disassembly and to force supplying means in the form of a force-applying bar 30 (FIGS. 1 and 6 through 10) in a manner to be described more fully hereinafter.

A pair of rods 21, 22 pass through respective bores 23, 24 (FIG. 6) of the member 11 and opposite end portions of the rods 21, 22 pass freely through openings 25, 26 in the plate 12*a* and are threaded into threaded bores (not shown) of the plate 12*b*. Thus, the rods 21, 22 are rigidly connected to the plate 12 and provide sliding guiding movement for the movable member or plate 11.

Figure 2:
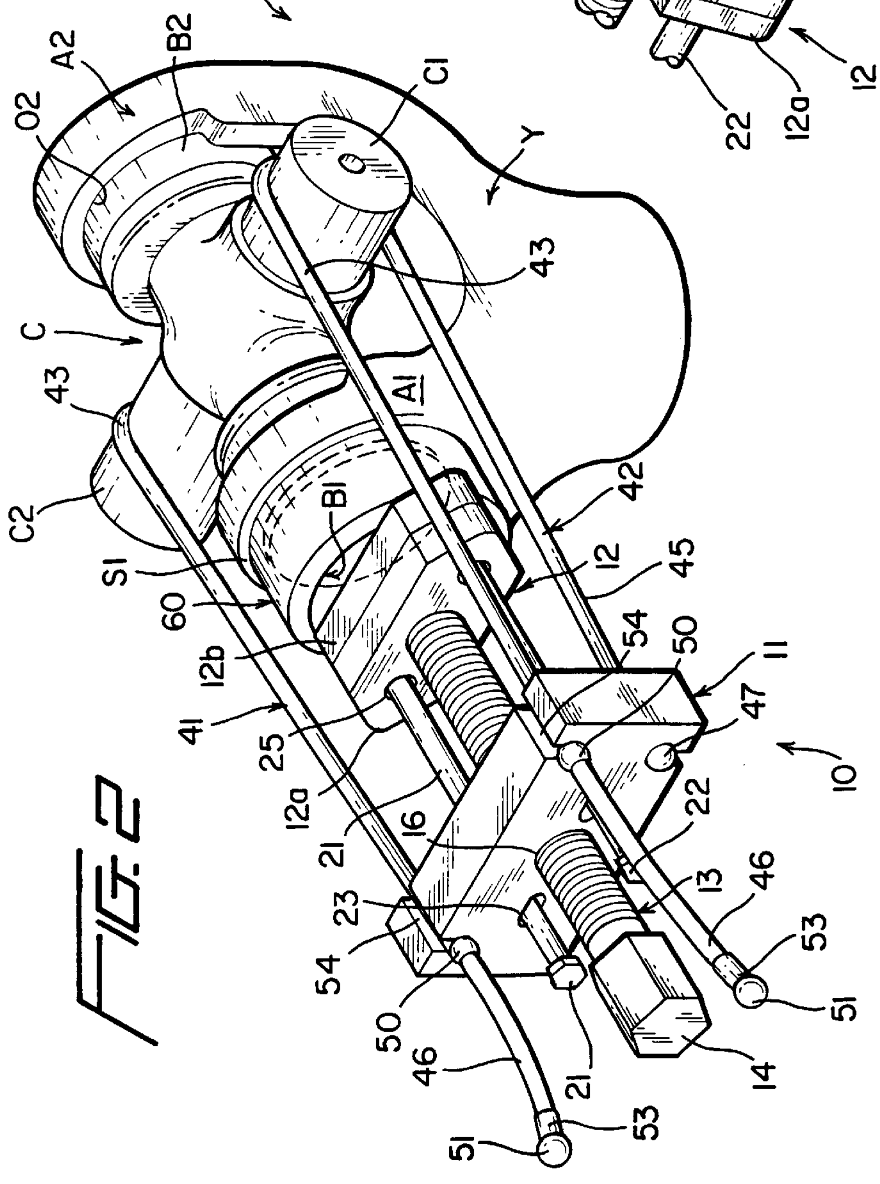
FIG. 2 is a perspective view of the universal joint tool of FIG. 1, and illustrates the tool associated with the yoke to disassemble a bearing assembly from one of the yoke arms, and specifically illustrates the manner in which the annular member bears against an exterior surface of the yoke arm and enlarged heads of the pair of flexible cables are connected to the first movable member to utilize shortened portions of the flexible cables for disassembly purposes.
Figure 6:
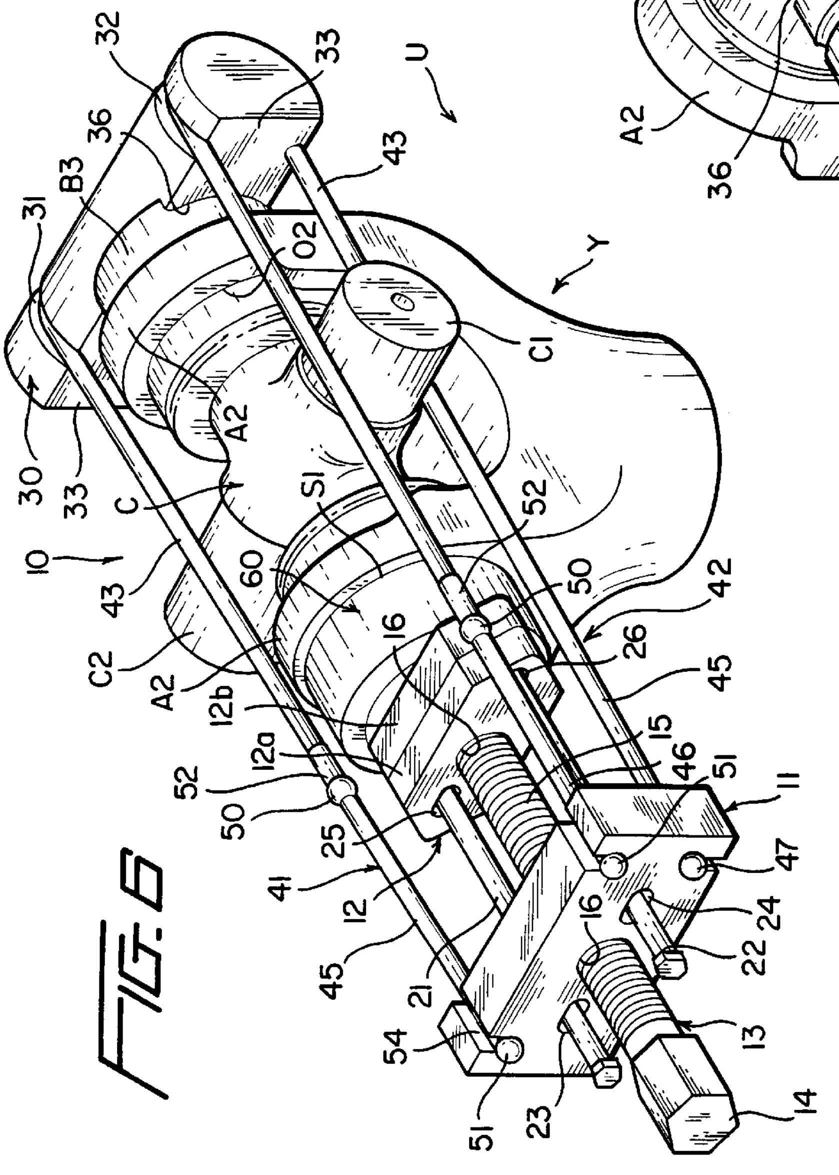
FIG. 6 is a perspective view of the universal joint tool assembled relative to the same yoke arms of FIGS. 2, 4 and 5, and illustrates a force-applying bar bearing against a bearing assembly which is to be pulled into the associated yoke arm opening as the now lengthened flexible cables are tensioned by appropriately rotating the screw to move the relatively movable members away from each other.

A pair of flexible cable means or cables 41, 42 are provided for entraining arms of the cross C normal to the arm from which a bearing assembly/cup is to be removed (FIG. 2), or for entraining the force-applying bar 30 (FIG. 6) which transfers the force of the screw 13 to remove/replace a bearing assembly. Each flexible cable 41, 42 includes respective medial or bight portions 43 and opposite end portions 45, 46. The end portions 45 each include an enlargement or enlarged head 47 crimped to the end portion 45 of each flexible cable 41, 42. The enlarged heads 47 constitute means for connecting each end portion 45 of each flexible cable 41, 42 to the plate 11 through grooves 48. A similar connecting means in the form of enlargements or enlarged heads crimped to the cables 41, 42 are designated by the reference numerals 50, 51 with the latter being crimped at the end of each flexible cable 41, 42. Generally cylindrical stems 52, 53, which facilitate the crimping of the heads 50, 51, respectively, to the end portion 46 of each of the flexible cables 41, 42 are of a size to slide through the slots 54 opening into through bores 55 having conical seats 56 of the movable member 11, as is best illustrated in FIGS. 2 and 6 of the drawings which also illustrate the selective utilization of the heads 50, 50 (FIG. 2) for bearing disassembly and the heads 51, 51 (FIG. 6) for bearing reassembly.

Figure 3:
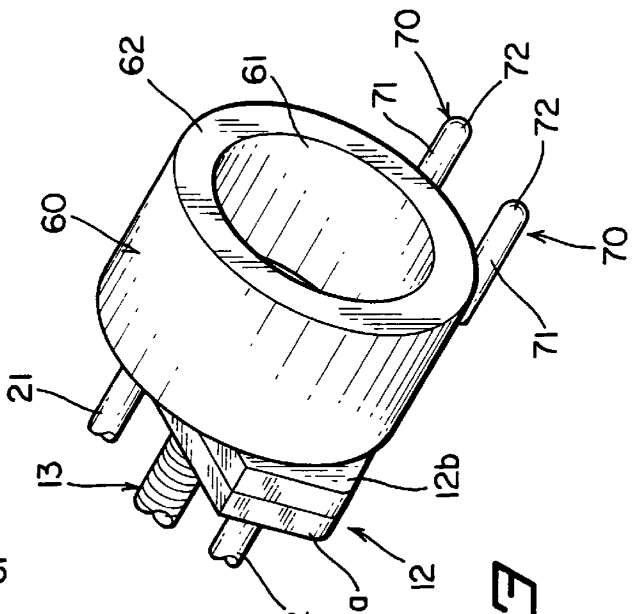
FIG. 3 is a fragmentary perspective view of portions of the universal joint tool of FIG. 1, particularly the annular member and the locating pins, and illustrates details of the latter including an annular uni-planar/flat bearing and locating surface of the annular member and smooth cylindrical surfaces and rounded ends of the locating/guide pins.

Means generally designated by the reference numeral 60 (FIGS. 1 through 3) is welded to the plate 12*b* of the second member 12 at a side thereof remote from the first member 11 and includes an interior cylindrical surface 61 defining a general cylindrical housing (unnumbered) for progressively accommodating a bearing assembly or bearing cup upon the removal thereof from an associated arm of the yoke Y. The bearing assembly accommodating means 60 is a sleeve of relatively strong metal having a machined peripheral face 62 which functions as a locating means or a locating surface in conjunction with the surfaces S1, S2 of the yoke arms A1, A2, respectively, as well be described more fully hereinafter. Suffice it to say, the locating surface 62 is substantially normal to the axis of the sleeve 60 and the axis of the screw 13.

Locating or guide means 70 are carried by the bearing assembly accommodating means or sleeve 60 in the form of identical guide pins or locating pins 70 which are welded to the exterior of the sleeve 60 with each pin 70 including an exterior cylindrical surface 71 and a rounded end 72. The diameter of each locating pin 70 is slightly less than the nominal internal diameter of the threaded bores T, T of each of the yoke arms A1, A2. Furthermore, the axial distance between the axes of the locating pins 70, 70 and the distance between the axis of each of the locating pins 70, 70 and the axis of the sleeve 60 is identical to the respective distances between each pair of threaded bores T, T and the distance of the threaded bores T, T from the axis of the yoke arm openings O1, O2. Accordingly, when the pins 70, 70 are inserted into the threaded openings T, T, as is illustrated in FIGS. 4 and 5, for example, and as is apparent from FIG. 2, the axes of the openings O1, O2 and the bearing assemblies B1, B2 are coaxial to the axis of the sleeve 60, again as is most readily apparent from FIGS. 2, 4 and 5 of the drawings. This allows each bearing assembly, as it is being "pulled" from its associated cross arm (C3, C4), to be accurately drawn into the sleeve 60 absent "cocking," as will be more apparent during a description of the disassembly of the bearings B1, B2 subsequently herein. The sleeve 60 also prevents "cocking" and assures accurate bearing assembly location relative to the openings O1, O2 when the tool 11 is used as a bearing assembly assembling tool, also as will be described more fully hereinafter.

In order to utilize the universal joint tool 10 for assembling bearing assemblies or bearing cages accurately and to precise depths with respect to the openings O1, O2 after the bearing assemblies B1, B2 have been "pulled" and discarded, two further elements of the tool 10 must be utilized, namely, the force-applying bar 30 (FIGS. 1, 6 and 7) and a gauge insert 80.

The force-applying bar 30 is embraced by the flexible cables or cable means 41, 42, particularly the bight portions 43 thereof for pushing a bearing assembly or bearing cup, such as the bearing assembly B3 heretofore noted, into the opening O2 after the bearing assembly B2 has been removed therefrom (FIG. 6). The means 30 (FIG. 1) is a relatively heavy steel bar having an exteriorly cylindrical surface (unnumbered) in which are machine means 31, 32 in the form of a pair of identical grooves sized to accommodate the bight portions 43 of the respective cables 41, 42, as is best illustrated in FIG. 6 of the drawings. Locating means 33 in the form of uni-co-planar flat surfaces are machined from the material of the force-applying bar 30 and the locating means or locating surfaces 33 are designed to contact and intimately bear against selective ones of the exterior surfaces S1, S2 of the yoke arms A1, A2, respectively, to limit and/or establish exact bearing assembly position relative to the associated opening O1, O2. Another flat locating surface 34 (FIG. 1) is recessed relative to the plane of the surfaces 33, 33 and is spaced a predetermined distance therefrom which distance is designated by the reference character "d" in FIG. 1 which is reflected by the height of concavely opposing walls 35, 36. The distance "d" is the maximum distance a particular bearing assembly is to project outwardly of its associated opening O1, O2 beyond the respective surfaces S1, S2, respectively, during assembly, as will be described more fully herein. The opposing curved walls 35, 36 are spaced to loosely accommodate therebetween a bearing assembly, such as the bearing assembly B3 (FIG. 8), incident to its assembly into the yoke arm.

The force-applying bar 30 also includes a lower projecting portion 37 having a pair of identical parallel bores 38 into which can be slid bolts 39 having threaded ends (unnumbered). The orientation and position of the smooth bores 38, 38 corresponds to the location, orientation and distance of the threaded bores T, T in each of the yoke arms A1, A2. Thus, the bolts 39 can be selectively threaded into the threaded bores T, T of the yoke arms A1, A2, as is most apparent in FIGS. 7 through 9 of the drawings, to accurately position the axis of revolution of the walls 35, 36 coaxial/coincident to the axis of the openings O1, O2 which maintains the bearing assembly B3 essentially aligned with the opening O2, for example, upon the assembly thereof in the manner to be described with respect to FIGS. 8 and 9 of the drawings.

Figure 10:
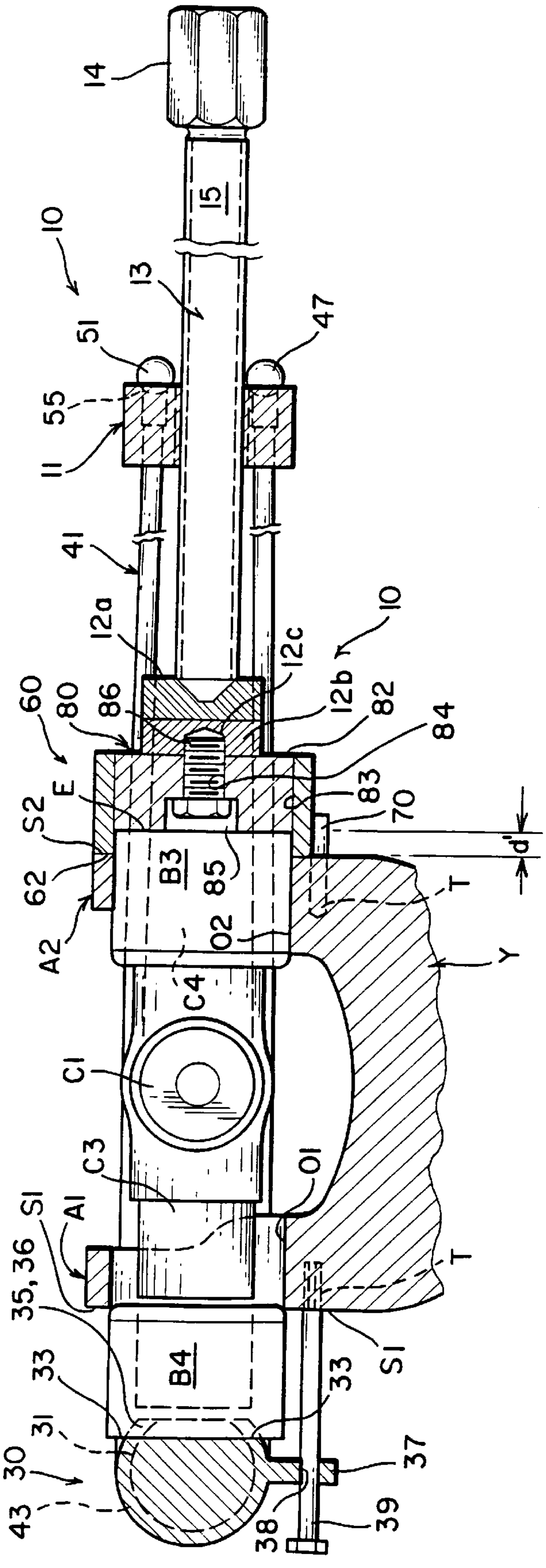
FIG. 10 is a cross-sectional view similar to FIGS. 8 and 9 of the drawings, and illustrates the universal joint tool reversed relative to the position shown in FIGS. 8 and 9 with an exposed portion of the inserted bearing assembly being housed in the annular member and bearing against the gauge insert thereof with the second bearing assembly positioned for insertion in the opposite yoke arm opening upon the tensioning of the flexible cables.

The gauge insert 80 (FIG. 1) is a piece of accurately machined metal having a cylindrical surface 81 and opposite generally parallel flat uni-planar surfaces 82, 83. The gauge insert 80 is selectively inserted within the sleeve 60 in the manner illustrated in FIG. 10 with the surface 82 of the gauge insert 80 abutting the plate 12*b* and the surface 83 being parallel to and axially spaced a distance d' from the surface 62 of the sleeve 60 which abuts the surface S2 (FIG. 10). The distance d' is identical to the distance d. The gauge insert 80 includes a bore 84 and a counter-bore 85 which accommodates a bolt 86 having a threaded end (unnumbered) which is threaded into a threaded bore 12*c* of the plate 12*b* (FIG. 10) to retain the gauge insert 80 within the sleeve 60 selectively in a manner to be described more fully hereinafter.

Bearing Assembly Removal

The bearing assembly B1 (FIG. 1) is removed by first unthreading the bolts F (FIG. 1) from the threaded openings T, T of the yoke arm A1, removing the chordal bearing retainer R, and guiding the guide pins 70, 70 into the threaded bores T. T until the exposed end portion (unnumbered) of the bearing B1 is partially received in the sleeve 60 and the locating surface 62 of the sleeve 60 abuts the surface S1 of the yoke arm A1, as is best illustrated in FIG. 4, with the members 11, 12 being positioned relatively adjacent to each other. The bight portions 43 of the flexible cables 41, 42 are embraced partially about the associated cross arms C1, C2, respectively, and the enlarged heads 50 are seated in the conical recesses 56 of the first member 11 in the manner clearly apparent in FIGS. 2 and 4 of the drawings. An impact hammer or other tool is connected to the head 14 of the screw 13 and the latter is rotated to draw the movable member 11 to the left from the position shown in FIG. 4 adjacent the member 12 toward, to and beyond the position shown in FIG. 5 during which the flexible cables 41, 42 are progressively loaded resulting the in the cross C being pulled to the left from the position shown in FIG. 4 to the position shown in FIG. 5. In FIG. 5 the bearing B1 is pushed fully into the sleeve 60 though a portion of the bearing B1 remains in the opening O1. However, the press fit between the bearing B1 and the opening O1 is completely "broken" or released in FIG. 5, and once the universal joint tool 10 is removed, the bearing B1 can be manually grasped and pulled from the opening O1. The universal joint tool 10 is, of course, removed from the yoke Y by reversing the direction of the rotation of the screw 13 which moves the plate 11 toward the plate 12 from the position shown in FIG. 5 to the position shown in FIG. 4 causing the relaxation/loosening of the flexible cables 41, 42 which can then be slipped from the respective cross arms C1, C2 of the cross C.

The bearing assembly B2 can now be removed from the opening O2 by simply reassembling the universal joint tool 10 with respect to the yoke arm A2, as just described relative to the yoke arm A1. That is, the locating pins 70, 70 are inserted into the openings T, T of the yoke arm A2, the flexible cables 41, 42 are embraced about the cross arms C1, C2, respectively (the latter occurs because of the 180° reorientation of the yoke Y relative to the tool 10), and again rotating the screw 13 to draw the cross C toward the yoke arm A2 and pulling the bearing B2 beyond its pressed fit with the opening O2.

Bearing Assembly Insertion

Figure 7:
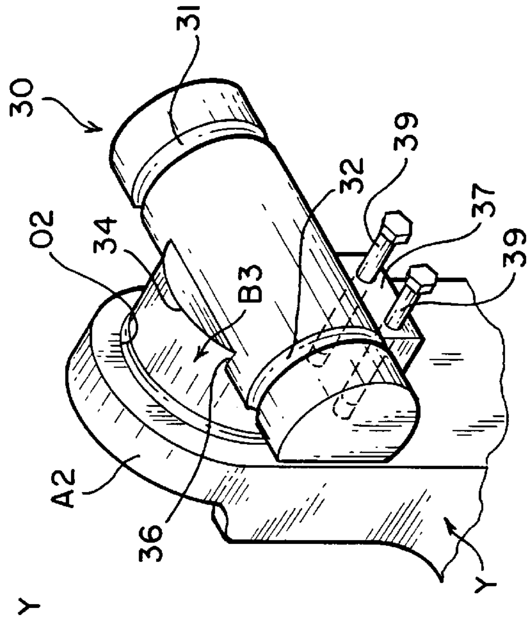
FIG. 7 is a fragmentary perspective view of the yoke arm and the force-applying bar, and illustrates a pair of bolts threaded into a threaded bores which receive the bearing retainer bolts and along which the force-applying bar can slide.

Reference is now made to FIGS. 6 through 8 of the drawings which illustrates the bearing assembly B3 essentially aligned with the opening O2 of the yoke arm A2 to which has been secured the force-applying bar 30 by the bolts 39 passed through the bores 38 (FIG. 1) and threaded into the threaded bores T, T of the yoke arm A2. An end wall E of the bearing assembly B3 bottoms against the surface 34 of the force-applying bar 30 and the bearing assembly B3 is generally confined between the curved walls 35, 36, as is most apparent from FIGS. 1 and 7 of the drawings. The locating pins 70, 70 of the sleeve 60 are inserted into the threaded bores T, T of the yoke arm A1. The flexible cables 41, 42 span the cross arms C1, C2 and the enlarged heads 51 of each flexible cable 41, 42 are seated in the conical recesses 56 of the member 11 with the bight portions 43 of the cables 41, 42 being received in the grooves 31, 32 in embracing relationship to the force-applying bar 30. The screw 13 is then rotated to draw the plate 11 to the left from the position shown in FIG. 8 which loads the cables 41, 42 drawing the force-applying bar 30 to the left, as viewed in FIGS. 1 and 8, and exerts a left-to-right force upon the bearing assembly B3 which progressively moves to the left to the position shown in FIG. 9 with the abutment of the locating surfaces 33 against the surface S2 of the yoke arm A2 establishing the axially outwardly projected distance "d" of the bearing B3 (FIG. 9). The bearing assembly B3 is illustrated in its fully inserted/seated position in FIG. 9.

From the position illustrated in FIG. 9, the screw 13 is rotated to release the tension of the flexible cables 41, 42 and the same are removed to allow the locating pins 70, 70 of the sleeve 60 to be withdrawn from the threaded openings T, T of the yoke arm A1. The gauge insert 80 is inserted into the annular member 60 and fastened therein by the bolt 86. The bolts 39, 39 are removed from the threaded openings T, T of the yoke arm A2 and a force-applying bar 30 is attached to the yoke arm A1 by threading the bolts 39, 39 into the threaded bores T, T of the yoke arm A1, as shown in FIG. 10. A bearing assembly or bearing cup B4 (FIG. 10) is slipped between the arcuate walls 35, 36 of the force-applying bar 30 and the annular member 60 is located relative to the yoke arm A2 by inserting the guide pins 70, 70 into the threaded bores T, T associated therewith, as shown in FIG. 10. The end wall E of the bearing assembly B3 bottoms against the gauge surface 83 of the gauge insert 80. Planes through the surface S2 of the yoke arm A2 and the surface 83 of the gauge insert 80 are parallel and correspond to the axial distances d, d'. The flexible cables 41, 42 span the cross arms C1, C2, are entrained in the grooves 31, 32 of the force-applying bar 30, and heads 51 thereof are inserted in the conical recesses 55 which reflects the position illustrated in FIG. 10. At this point the screw 13 is rotated to tension the flexible cables 41, 42 drawing the force-applying bar 30 from left-to-right in FIG. 10 which in turn forcibly progressively inserts the bearing assembly B4 into the opening O1 of the yoke arm A1 until the surface S1 of the yoke arm A1 is abutted by the surfaces 33, 33 of the force-applying bar 30 which establishes the axial projecting distance "d" of the bearing assembly B4 axially outwardly of the surface S1. Though the latter is not illustrated, the net effect of drawing the bearing assembly B4 into the opening O1 of the yoke arm A1 is to achieve identical projections of both bearing assemblies B3, B4 outwardly from the respective surfaces S2, S1, respectively, the distances d and d' which, of course, achieves necessarily precise centering of the cross C relative to the yoke Y and subsequently relative to the entire universal joint U.

After the bearing assemblies B3, B4 have been thus inserted into the respective openings O2, O1, the bearing assembly retainers R are assembled to the yoke arms A1, A2 by the fasteners F, F.

Although a preferred embodiment of the invention has been specifically illustrated and described herein, it is to be understood that minor variations may be made in the apparatus without departing from the spirit and scope of the invention, as defined the appended claims.

I claim:

1. A universal joint tool for disassembling a universal joint including its cross and bearing cups from drive shaft and/or transmission shaft yokes comprising first and second relatively movable members adapted to be moved between a first relatively adjacent position and a second relatively spaced position, means for applying an axial force between said first and second members to move the same from said first position to said second position incident to removing a bearing cup from an arm of an associated universal joint cross, a pair of flexible cable means for entraining arms of the cross normal to the arm from which a bearing cup is to be removed, each of said pair of flexible cable means having opposite ends connected to said first member whereby upon operation of said force applying means said movable members are moved from said first position toward said second position with the resultant removal of an associated bearing cup, and a pair of guide means fixed to said second member and radially offset to the same side of an axial plane which extends parallel to the direction of the axial force of said force applying means for accurately locating said puller in assembled relationship to an associated universal joint yoke.

2. The universal joint tool as defined in claim 1 wherein said guide means are a pair of guide pins.

3. The universal joint tool as defined in claim 1 wherein said guide means are a pair of guide pins, and said guide pins each include a substantially smooth exterior surface.

4. The universal joint tool as defined in claim 1 wherein said guide means are a pair of guide pins, and said guide pins each include a substantially smooth accurate end surface.

5. The universal joint tool as defined in claim 1 wherein said guide means are a pair of guide pins, said guide pins each include a substantially smooth exterior surface, and said guide pins each include a substantially smooth accurate end surface.

6. A universal joint tool for assembling a universal joint including its cross and bearing cups relative to drive shaft and/or transmission shaft yokes comprising first and second relatively movable members adapted to be moved between a first relatively adjacent position and a second relatively spaced position, means for applying a force between said first and second members to move the same from said first position to said second position incident to assembling a bearing cup upon an arm of an associated universal joint cross, a pair of flexible cable means for entraining arms of the cross normal to the arm upon which a bearing cup is to be assembled, each of said pair of flexible cable means having a bight portion and opposite ends with said opposite ends being connected to said first member whereby upon operation of said force applying means said movable members are moved from said first position toward said second position, means embraced by said cable means bight portions for pushing a bearing cup toward said first and second members in a direction opposite the direction of the force applied thereby to progressively advance a bearing cup into assembled relationship upon an arm of an associated universal joint cross, and said embraced means include a pair of grooves in each of which is at least partially received one of said cable means bight portions.

7. The universal joint tool as defined in claim 6 including means for limiting the advancement of the bearing cup upon the arm of an associated universal joint cross.

8. The universal joint tool as defined in claim 6 including means for limiting the advancement of the bearing cup into an opening of a yoke arm associated with the universal joint cross arm upon which the bearing cup is progressively pushed.

9. The universal joint tool as defined in claim 8 wherein said limiting means includes a recess in said pushing means having a configuration to accommodate a bearing cup and a depth corresponding substantially to the axial exposed distance of the bearing cup beyond an exterior face of its associated yoke arm.

10. The universal joint tool as defined in claim 8 wherein said limiting means includes a generally cylindrical recess in said pushing means having a configuration to accommodate a bearing cup and a depth corresponding substantially to the axial exposed distance of the bearing cup beyond an exterior face of its associated yoke arm.

11. The universal joint tool as defined in claim 6 including means for locating said pushing means upon a yoke arm into an opening of which the bearing cup is progressively pushed.

12. The universal joint tool as defined in claim 6 including means for locating said pushing means upon a yoke arm into an opening of which the bearing cup is progressively pushed, and said locating means are a pair of guide means associated with said pushing means and radially offset to the same side of an axial plane through the direction of force of said force applying means for accurately locating said pushing means relative to the associated yoke arm.

13. The universal joint tool as defined in claim 6 including means for locating said pushing means upon a yoke arm into an opening of which the bearing cup is progressively pushed, and said locating means are a pair of guide pins associated with said pushing means and radially offset to the same side of an axial plane through the direction of force of said force applying means for accurately locating said pushing means relative to the associated yoke arm.

14. The universal joint tool as defined in claim 6 including means for locating said pushing means upon a yoke arm into an opening of which the bearing cup is progressively pushed, said locating means are a pair of guide pins associated with said pushing means and radially offset to the same side of an axial plane through the direction of force of said force applying means for accurately locating said pushing means relative to the associated yoke arm, and said guide pins include thread means for threading into threaded bores of an associated yoke arm.

15. The universal joint tool as defined in claim 6 including means for locating said pushing means upon a yoke arm into an opening of which the bearing cup is progressively pushed, said locating means are a pair of guide pins associated with said pushing means and radially offset to the same side of an axial plane through the direction of force of said force applying means for accurately locating said pushing means relative to the associated yoke arm, and said pushing means is mounted for sliding movement relative to said guide pins.

16. The universal joint tool as defined in claim 6 including means for mounting said pushing means for sliding movement relative to an associated yoke arm into an opening of which the bearing cup is advanced into assembled relationship with the arm of an associated joint cross.

17. A universal joint tool for assembling a universal joint including its cross and bearing cups relative to drive shaft and/or transmission shaft yokes comprising first and second relatively movable members adapted to be moved between a first relatively adjacent position and a second relatively spaced position, means for applying a force between said first and second members to move the same from said position to said second position incident to assembling a bearing cup upon an arm of an associated universal joint cross, a pair of flexible cable means for entraining arms of the cross normal to the arm upon which a bearing cup is to be assembled; each of said pair of flexible cable means having a bight portion and opposite ends with said opposite ends being connected to said first member whereby upon operation of said force applying means said movable members are moved from said first position toward said second position whereby a bearing cup is progressively pushed into an opening of a yoke arm and upon an arm of a universal joint cross, means for limiting the axial protruding distance of the bearing cup relative to an exterior surface of the yoke arm into the opening of which the bearing cup is pushed to effect precise centering of the cross and yoke upon all bearing cups being thus assembled, said limiting means includes a recess at least partially housing the associated bearing cup, said recess is formed in a bar disposed in spanning relationship to an associated yoke arm, and said bar includes a pair of grooves each receiving one of said bight portions.

18. A universal joint tool for assembling a universal joint including its cross and bearing cups relative to drive shaft and/or transmission shaft yokes comprising first and second relatively movable members adapted to be moved between a first relatively adjacent position and a second relatively spaced position, means for applying a force between said first and second members to move the same from said first position to said second position incident to assembling a bearing cup upon an arm of an associated universal joint cross, a pair of flexible cable means for entraining arms of the cross normal to the arm upon which a bearing cup is to be assembled; each of said pair of flexible cable means having a bight portion and opposite ends with said opposite ends being connected to said first member whereby upon operation of said force applying means said movable members are moved from said first position toward said second position whereby bearing cups are progressively pushed into an associated of a yoke arm and upon an associated arm of a universal joint cross, first and second limiting means for limiting the axial protruding distance of first and second axially opposite bearing cups relative to first and second exterior surfaces of first and second yoke arms into first and second openings of which the first and second bearing cups are pushed to effect precise centering of the cross and yoke upon all bearing cups being thus assembled, at least one of said first and second limiting means include a recess at least partially housing the associated bearing cup, said recess is formed in a bar disposed in spanning relationship to an associated one of the first and second yoke arms, and said bar includes a pair of grooves each receiving one of said bight portions.

19. A universal joint tool for assembling a universal joint including its cross and bearing cups relative to drive shaft and/or transmission shaft yokes comprising first and second relatively movable members adapted to be moved between a first relatively adjacent position and a second relatively spaced position, means for applying a force between said first and second members to move the same from said first position to said second position incident to assembling a bearing cup upon an arm of an associated universal joint cross, a pair of flexible cable means for entraining arms of the cross normal to the arm upon which a bearing cup is to be assembled; each of said pair of flexible cable means having a bight portion and opposite ends with said opposite ends being connected to said first member whereby upon operation of said force applying means said movable members are moved from said first position toward said second position whereby bearing cups are progressively pushed into an associated of a yoke arm and upon an associated arm of a universal joint cross, first and second limiting means for limiting the axial protruding distance of first and second axially opposite bearing cups relative to first and second exterior surfaces of first and second yoke arms into first and second openings of which the first and second bearing cups are pushed to effect precise centering of the cross and yoke upon all bearing cups being thus assembled, said first and second limiting means include respective first and second recess means at least partially housing therein the respective first and second bearing cups, said first recess means is defined by an annular wall, said second recess means is defined in a bar, and said bar includes a pair of grooves each receiving one of said bight portions.

20. A universal joint tool for assembling a universal joint including its cross and bearing cups relative to drive shaft and/or transmission shaft yokes comprising first and second relatively movable members adapted to be moved between a first relatively adjacent position and a second relatively spaced position, means for applying a force between said first and second members to move the same from said first position to said second position incident to assembling a bearing cup upon an arm of an associated universal joint cross, a pair of flexible cable means for entraining arms of the cross normal to the arm upon which a bearing cup is to be assembled; each of said pair of flexible cable means having a bight portion and opposite ends with said opposite ends being connected to said first member whereby upon operation of said force applying means said movable members are moved from said first position toward said second position whereby bearing cups are progressively pushed into an associated of a yoke arm and upon an associated arm of a universal joint cross, first and second limiting means for limiting the axial protruding distance of first and second axially opposite bearing cups relative to first and second exterior surfaces of first and second yoke arms into first and second openings of which the first and second bearing cups are pushed to effect precise centering of the cross and yoke upon all bearing cups being thus assembled, said first and second limiting means include respective first and second recess means at least partially housing therein the respective first and second bearing cups, said first recess means is defined by an annular wall, said second recess means is defined in a bar, a gauge insert housed in said first recess means against which said first bearing cup bottoms, and said bar includes a pair of grooves each receiving one of said bight portions.

* * * * *